United States Patent
Westerkamp et al.

[19]

[11] Patent Number: 6,116,586
[45] Date of Patent: Sep. 12, 2000

[54] LEVEL CONTROL ARRANGEMENT FOR VEHICLES HAVING AIR SPRINGS

[75] Inventors: Helge Westerkamp, Hannover; Uwe Folchert, Gehrden; Heinz Job, Garbsen, all of Germany

[73] Assignee: Continental Aktiengesellschaft, Hannover, Germany

[21] Appl. No.: 09/168,970

[22] Filed: Oct. 9, 1998

[30] Foreign Application Priority Data

Oct. 13, 1997 [DE] Germany .......................... 197 45 195

[51] Int. Cl.⁷ .............................. F16F 9/43; B60G 11/26
[52] U.S. Cl. .................................. 267/64.28; 280/124.16
[58] Field of Search ........................... 267/64.28, 64.11, 267/DIG. 1; 280/6.157, 6.158, 6.159, 124.16, FOR 171

[56] References Cited

U.S. PATENT DOCUMENTS

| | | |
|---|---|---|
| 4,465,297 | 8/1984 | Yamahara . |
| 4,826,141 | 5/1989 | Buma et al. ........................ 267/64.28 |
| 5,176,404 | 1/1993 | Sulzyc ..................................... 280/840 |
| 5,452,919 | 9/1995 | Hoyle et al. ............................ 280/840 |
| 5,466,007 | 11/1995 | Smith ..................................... 280/840 |
| 5,484,162 | 1/1996 | Kanoh et al. .......................... 280/711 |
| 5,669,418 | 9/1997 | Wode ..................................... 137/859 |
| 5,794,924 | 8/1998 | Stolpp .................................. 267/64.11 |

FOREIGN PATENT DOCUMENTS

| | | |
|---|---|---|
| 0165376 | 12/1985 | European Pat. Off. . |
| 0224663 | 6/1987 | European Pat. Off. . |
| 0400301 | 12/1990 | European Pat. Off. . |
| 3919438 | 12/1990 | Germany . |
| 4235111 | 4/1994 | Germany . |
| 4327763 | 2/1995 | Germany . |
| 195 28 852 | 2/1997 | Germany . |
| 197 24 747 | 6/1998 | Germany . |

*Primary Examiner*—Robert J. Oberleitner
*Assistant Examiner*—Bradley King
*Attorney, Agent, or Firm*—Walter Ottesen

[57] ABSTRACT

The invention relates to a level control arrangement for a vehicle having air springs (8) via which the chassis of the vehicle is suspended relative to at least one vehicle axle. A pneumatically-controllable directional-control valve (18) is arranged between the compressor (4) and the air dryer (6) and the directional-control valve (18) has two control inputs (20 and 22). In the base state of the level control arrangement, the compressor (4) is connected via the pneumatically-controllable directional-control valve (18) to the air dryer (6). When the control line (26) of the first control input (20) is connected via a controllable directional-control valve (30) to the atmosphere, the pneumatically-controllable directional-control valve 18 transfers into the other switching state and the air spring (8) can be vented via the air dryer (6). The pneumatically-controllable directional-control valve (18) permits large flow cross sections to be switched so that the air dryer (6) can be rapidly vented when venting the air spring (8) and a regeneration of the air dryer (6) is then possible in an especially advantageous manner.

5 Claims, 4 Drawing Sheets

LEVEL CONTROL ARRANGEMENT FOR VEHICLES HAVING AIR SPRINGS

FIELD OF THE INVENTION

The invention relates to a level control arrangement for vehicles having air springs which suspend a vehicle chassis relative to at least one spring axle. Each air spring can be connected for filling to an air pressure source via an air dryer. Each air spring can be connected to the atmosphere via the air dryer for discharging air.

BACKGROUND OF THE INVENTION

A level control arrangement for a vehicle having air springs is, for example, disclosed in U.S. Pat. No. 4,465,297. For filling the air spring, the air spring is connected to an air pressure source via an air dryer, a check valve and an electrically-drivable first directional control valve. When discharging the air spring, the air spring is connected to the atmosphere via the first electrically-drivable directional control valve, a throttle, the air dryer and via a second electrically-drivable directional control valve. When discharging the air spring, the air dryer is operated in the regeneration mode.

Regeneration of the air dryer is important for a trouble-free operation of the level control. For this regeneration, it is necessary that the air dryer be vented in the regeneration mode as rapidly as possible. This is not possible in the known level control arrangement disclosed in U.S. Pat. No. 4,465,297 because the air from the air dryer escapes via an electrically-drivable control valve during the regeneration mode. Only a small cross section can be switched on the control valve.

SUMMARY OF THE INVENTION

It is an object of the invention to provide a level control arrangement for a vehicle having air springs wherein a good regeneration of the air dryer is possible during the regeneration mode.

The level control arrangement of the invention is for a vehicle with an air spring for suspending the chassis of the vehicle relative to at least one axle. The level control arrangement includes: a source for supplying pressurized air; an air dryer connected to the air spring; a pneumatically-controllable directional-control valve having first and second control inputs and being switchable between a first switching position wherein the source is connected to the air spring via the air dryer and a second switching position wherein the air dryer is connected to the atmosphere thereby venting the air spring to the atmosphere; a chargeable line chargeable with the pressurized air from the source; a first control line connecting the first control input to the chargeable line; a second control line connecting the second control input to the chargeable line; a return spring for applying a force to the directional-control valve for fixing the valve in the first switching state when the pressure in the first and second control lines is identical; and, means for connecting and disconnecting the first control line to the atmosphere whereby the directional-control valve is switched into the second switching state when the first control line is connected to the atmosphere.

The advantages achieved with the invention are especially seen in that large cross sections can be switched with the pneumatically-controllable directional-control valve so that a rapid venting of the air dryer via the pneumatically-controllable directional-control valve is possible. In this way, an optimal regeneration of the air dryer is ensured even under unfavorable operating conditions wherein high humidity is present in the air dryer. A further advantage of the invention is that the level control is simply configured. No further controllable directional-control valves are needed except for the pneumatically-controllable directional-control valve and a controllable additional directional-control valve with which the control line of the first control input of the pneumatically-controllable directional-control valve can be connected to the atmosphere.

According to a first embodiment of the invention, the pneumatically-controllable directional-control valve is arranged between the air pressure source and the air dryer. In a first switching state, this directional-control valve connects the air pressure source to the air dryer and, in the second switching state, the directional-control valve connects the atmosphere to the air dryer.

A level control arrangement is also known from U.S. patent application Ser. No. 09/094,399, filed Jun. 10, 1998, and incorporated herein by reference. In this level control arrangement, a pneumatically-controllable directional-control valve is disposed between the air pressure source and the air dryer. In a first switching state, the air pressure source is connected to the air dryer and, in a second switching state, the directional-control valve connects the air dryer to the atmosphere. The pneumatically-controllable directional-control valve, however, includes only one control line.

According to another embodiment of the invention, the pressure-chargeable line bridges the air dryer, that is, the pressure-chargeable line branches between the air pressure source and the air dryer and terminates again on a line rearward of the air dryer. This line leads to the air springs. The pneumatically-controllable directional-control valve is arranged in this pressure-chargeable line. The advantage of this embodiment is that the air from the air pressure source reaches the air dryer directly when filling the air springs and is not guided via the pneumatically-controllable directional-control valve as in the first embodiment. When releasing air into the atmosphere, only air from the air springs is guided via the pneumatically-controllable directional-control valve after this air has passed through the air dryer. Accordingly, in this embodiment, no humid air reaches the pneumatically-controllable directional-control valve so that the danger of icing of the valves is reduced. Furthermore, the level control arrangement according to the second embodiment has a simpler constructive configuration.

According to a further feature of the invention, the control line of the first control input can be connected to the atmosphere via a controllable 3/2 directional-control valve in a first switching position and connected to the pressure-chargeable line in a second switching position.

According to another embodiment of the invention, the control line of the first control input has two parts of which the first part leads to the first control input and can be connected via a controllable 2/2 directional-control valve directly to the atmosphere and the second part can be connected via a throttle to the pressure-chargeable line. The advantage of this embodiment is that in the level control arrangement only simply configured components are used and a level control arrangement of this type can be especially cost effectively manufactured.

According to another embodiment of the invention, a residual pressure holding valve is arranged between the air spring and the air dryer. The air spring is connected to the air dryer via this residual pressure holding valve for venting. Preferably, the residual pressure holding valve is configured as a controllable residual pressure holding valve. The advantage of this further embodiment is that an air spring is not vented below a pregiven residual pressure when venting. This is especially important when the vehicle is lifted with the aid of a lift.

According to another embodiment of the invention, the pressure-charged line connects the air dryer to the pneumatically-controllable directional-control valve. The free ends of the control line lead to this pressure-charged line. In this case, and in the base state of the level control arrangement, the control inputs of the pneumatically-controllable valve are charged with the air pressure which is present at the input of the air dryer facing toward the air pressure source. The advantage of this further embodiment is that a compact configuration is possible. It is especially possible to integrate the control lines into the pneumatically-controllable directional-control valve.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
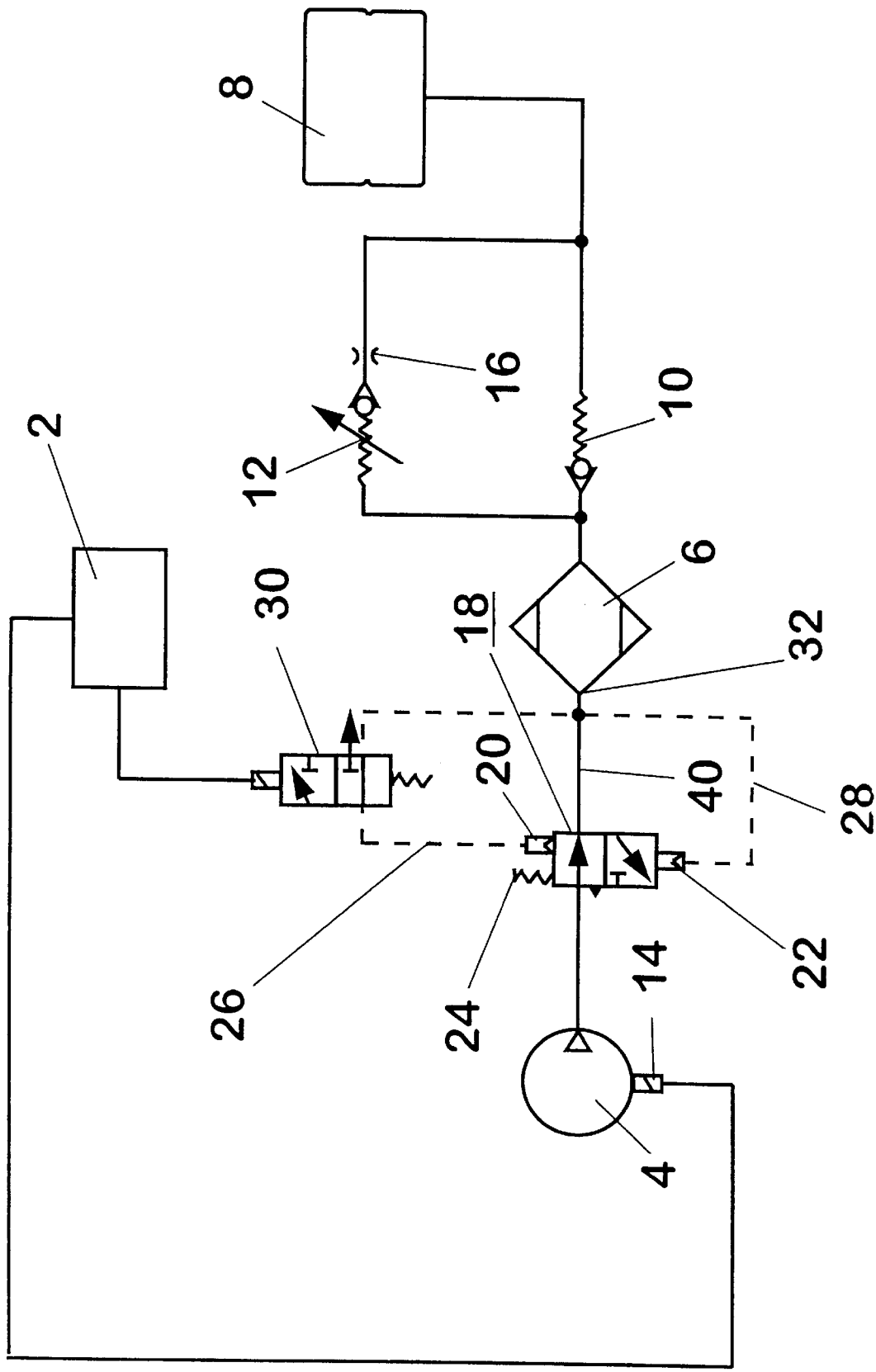
FIG. 1 a schematic of a first embodiment of the level control arrangement of the invention.

FIG. 1 shows a level control arrangement for a vehicle having air springs 8 wherein the controllable directional-control valves 18 and 30 are so switched that the level control arrangement is in its base state. This base state is described above as the first switching state and is the state wherein the air springs 8 are neither filled nor vented. In the base state, the same air pressure is present at the control inputs 20 and 22 and this air pressure can be made available from any desired source. Preferably, the free ends of the control lines 26 and 28 are, however, connected to the pressure-charged line 40 between the pneumatically-controllable directional-control valve 18 and the air dryer 6 so that the control inputs 20 and 22 can be charged in the base state with that air pressure which is present at the input 32 of the air dryer 6 facing toward the air compressor 4. The pneumatically-controllable directional-control valve 18 is stably fixed in the base state by the return spring 24. In the embodiment shown, the pneumatically-controllable directional-control valve 18 is charged at the end of the control input 20 by the return spring 24. However, it is likewise possible to charge the valve at the side of the control input 22 by the return spring 24.

If the air spring 8 is to be filled, then the control unit 2 transmits a control signal to the control input 14 of the compressor 4 whereupon the compressor starts to run. The air spring 8 is then filled via the pneumatically-controllable directional-control valve 18, the air dryer 6 and the check valve 10. Here, the air dryer 6 runs in the drying mode. If the fill operation is to be ended, a signal is transmitted from the control unit 2 to the control input 14 of the compressor 4 whereupon the compressor stops running. When filling the air spring 8, the controllable directional-control valves 18 and 30 assume the same position as in the base state.

If the air spring 8 is to be vented, then the control input of the electrically-controllable 3/2 directional-control valve 30 is driven by the control unit 2 so that this valve transfers from the switching state shown in FIG. 1 into the other switching state. This control line 26 of the first control input 20 of the pneumatically-controllable directional-control valve 18 is then connected to the atmosphere so that the pressure drops in the control line 26. The pressure does not drop in the control line 28 of the second control input 22 of the pneumatically-controllable directional-control valve 18 (it should be noted, that the 3/2 directional-control valve 30 also blocks the control line 28 to the atmosphere in the other switching position). For this reason, the pneumatically-controllable directional-control valve 18 is transferred from the switching position shown in FIG. 1 into the other switching position against the return force of the return spring 24. The air spring 8 is then connected via the throttle 16, the residual pressure holding valve 12 and the air dryer 6 to the atmosphere. The air dryer 6 is operated in the regeneration mode when venting the air spring 8. The air spring 8 can be vented only to a residual pressure which is pregiven by the controllable residual pressure holding valve 12.

If the air spring 8 is not to be vented any further, then the electrically-controllable 3/2 directional-control valve 30 is switched by the control unit 2 so that no current flows therethrough and the 3/2 directional-control valve 30 again assumes the switching state shown in FIG. 1. Directly after this switching state has been assumed, the same air pressure is present in the control line 26 of the first control input 20 as in the control line 28 of the second control input 22 so that a pressure equilibrium is present at the control inputs 20 and 22. The pneumatically-controllable directional-control valve 18 then transfers into the switching state shown in FIG. 1 because of the return force of the return spring 24. The level control arrangement is then again in the base state and is ready for a renewed filling or venting of the air spring 8.

The directional-control valve 18 is configured as a pneumatically-controllable directional-control valve. For this reason, the valve 18 can have a high flow cross section and, as a consequence thereof, the air dryer 6 can be rapidly vented in the regeneration mode. In this way, a good regeneration of the air dryer 6 is ensured even under unfavorable operating conditions of the level control arrangement.

Figure 2:
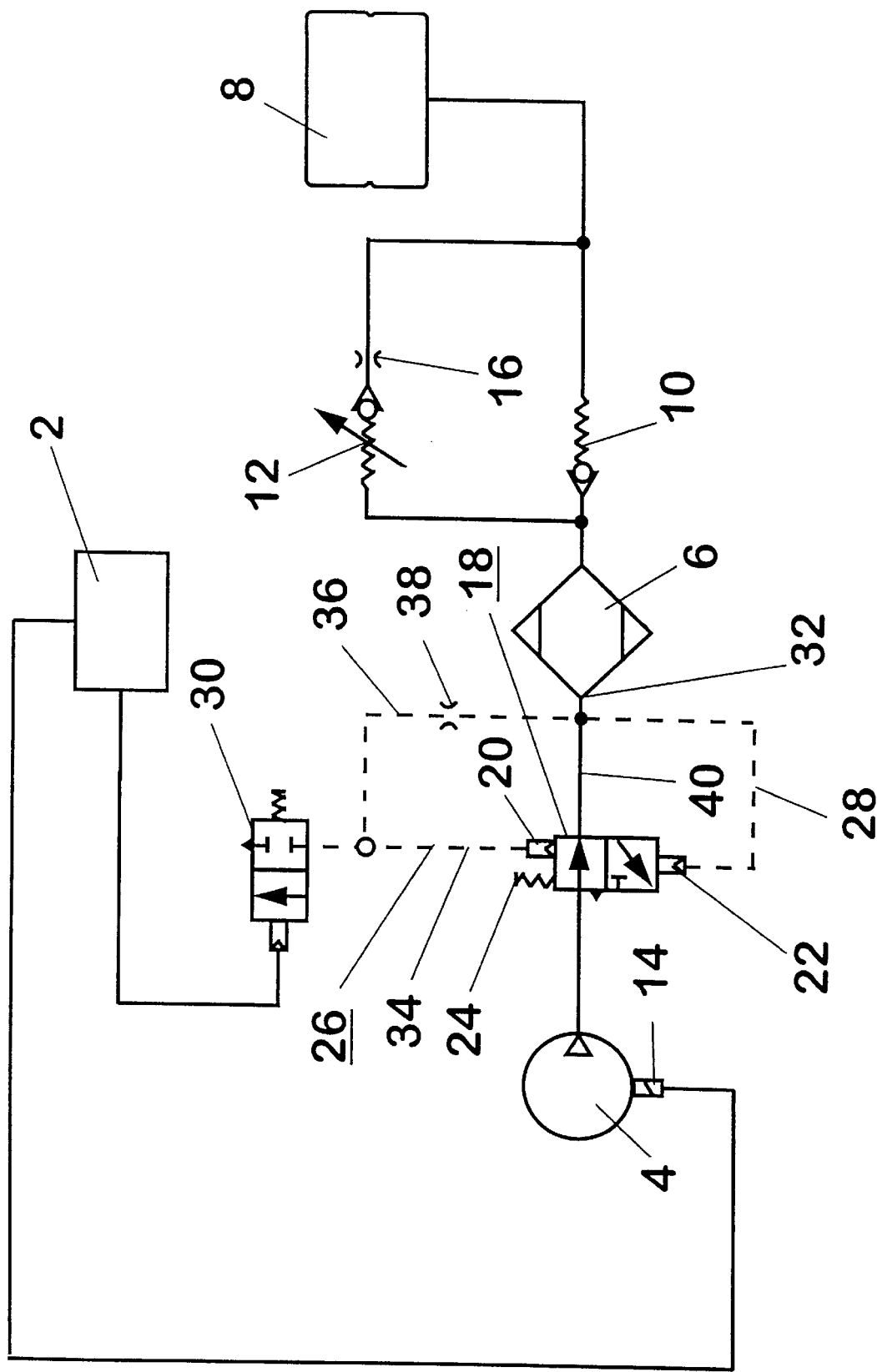
FIG. 2 is a schematic of a second embodiment of the level control arrangement of the invention.

FIG. 2 shows a level control arrangement for a vehicle having air springs 8 which is configured substantially in the same manner as the level control arrangement shown in FIG. 1. Only the configuration between the compressor 4 and the air dryer 6 is different. In the level control arrangement shown in FIG. 2, the controllable directional-control valves 18 and 30 are so connected that the level control arrangement assumes its base state. Filling of the air springs 8 takes place with the aid of the compressor 4 in the same manner as already described in connection with FIG. 1.

To vent the air spring 8, the electrically-controllable 2/2 directional-control valve 30 is driven by the control unit 2 so that the directional-control valve 30 transfers from the switching state shown in FIG. 2 into the other switching state. The first part 34 of the control line 26 leads to the control input 20 and is then connected directly to the atmosphere so that atmospheric pressure is immediately present at the control input 20. A higher pressure is present at the second control input 22. For this reason, the pneumatically-controllable directional-control valve 18 transfers from the switching state shown in FIG. 2 into the other switching state. The air spring 8 is then connected to the atmosphere via the throttle 16, the residual-pressure holding valve 12 and the compressor 6. The second part 36 of the control line of the first control input 20 and the control line 28 are also connected to the atmosphere via the controllable directional-control valve 30. For this reason, a small quantity of air flows via this path into the atmosphere when venting the air spring 8. The throttle 38 in the second part 36 of the control line 26 effects a pressure drop in the flow direction during the flow so that, because of this pressure drop, the pressure, which acts on the control input 20, is always less than the pressure that acts on the control input 22. For this reason, the pneumatically-controllable directional-control valve 18 assumes a stable switching state when venting the air spring 8.

If the air spring 8 is not to be vented further, then the electrically-controllable directional-control valve 30 is first switched by the control unit 2 so that no current flows therethrough and so that this directional-control valve again assumes the switching state shown in FIG. 2. After a short time, the same air pressure adjusts in the first control line 26 as in the second control line 28 so that the same air pressures are effective at the control inputs 20 and 22. Because of the return force of the return spring 24, the pneumatically-controllable directional-control valve 18 then again assumes the switching position shown in FIG. 2 and the level control arrangement transfers again into its base state.

Figure 3:
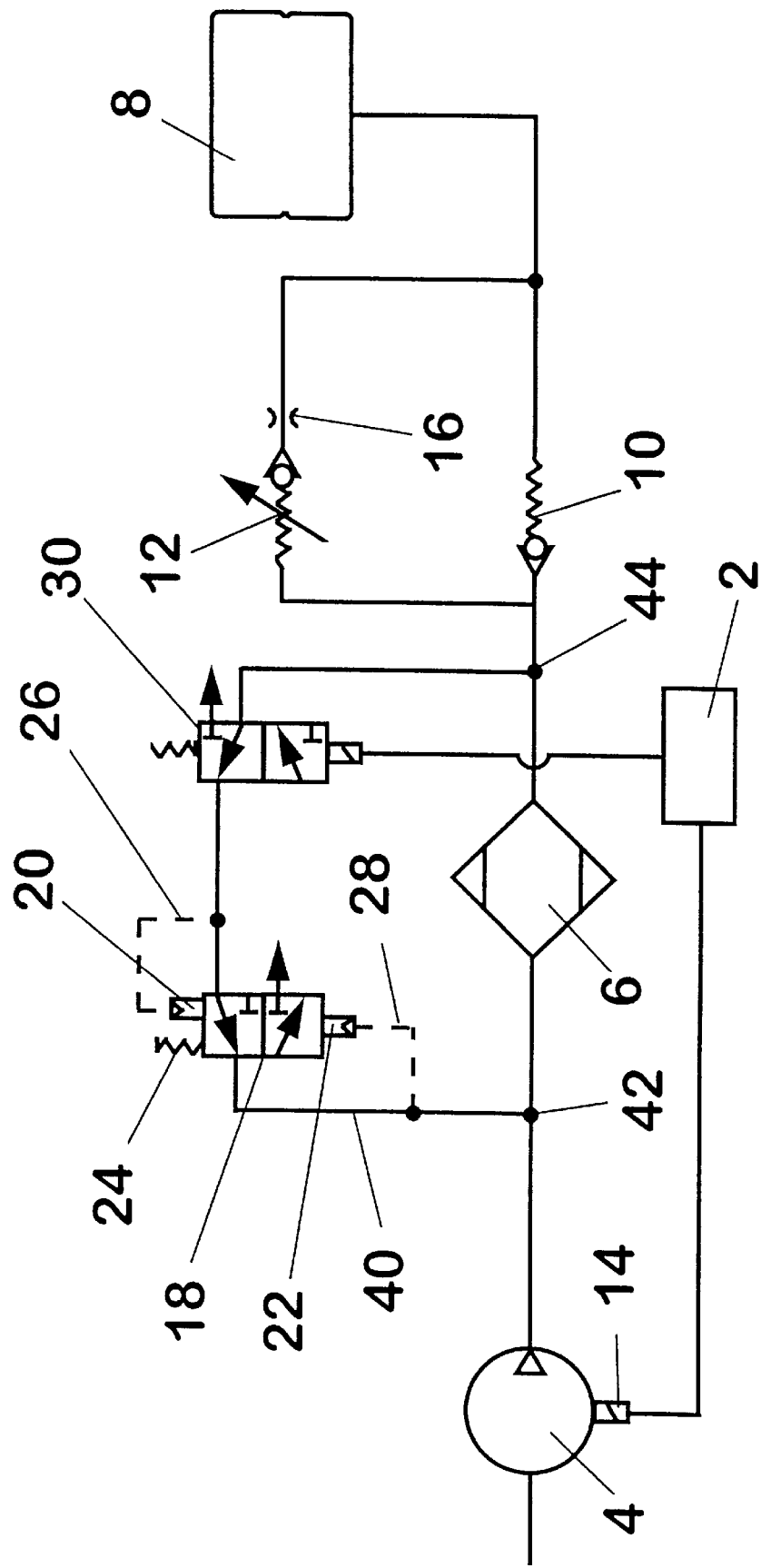
FIG. 3 is a third embodiment of the level control arrangement of the invention; and, FIG. 4 is a fourth embodiment of the level control arrangement of the invention.

FIG. 3 likewise shows a level control arrangement for a vehicle having air springs 8. The controllable directional-control valves 18 and 20 are so switched that the level control arrangement is in the base state. The base state has been initially described herein as the first switching state, that is, the air springs 8 are neither filled nor vented.

In the embodiment shown in FIG. 3, the air dryer 6 is bridged by the pressure-chargeable line 40, that is, the pressure-chargeable line 40 branches away at point 42 from the line which leads to the air springs 8 and is again brought back to the line which leads to the air springs 8 rearward of the air dryer 6 at point 44. The point 42 lies between the compressor 4 and the air dryer 6. The control valves 18 and 30 are located in the pressure-chargeable line. The control inputs 20 and 22 of the pneumatically-controllable directional-control valve 18 are connected via control lines 26 and 28, respectively, to the pressure-chargeable line 40. In the base state of the level control arrangement, the same air pressure is present at the control inputs 20 and 22 and the pneumatically-controllable directional-control valve 18 is stably fixed in the base state (that is, the first switching state) by the return spring 24.

If the air spring 8 is to be filled, then the control unit 2 sends a control signal to the control input 14 of the compressor 4 whereupon the compressor starts to run. The air spring 8 is then filled via the air dryer 6 and the check valve 10. The air dryer 6 runs in the drying mode. When the fill operation is to be ended, then a signal is again transmitted from the control unit 2 to the control input 14 of the compressor whereupon the compressor stops running. The controllable directional-control valves 18 and 30 assume the base state shown in FIG. 3 when filling the air spring 8. Furthermore, and when filling the air spring, only air from the compressor 4 is conducted via the air dryer 6 and the check valve 10 into the air spring 8. A conductance of the air from the compressor 4 via the pressure-chargeable line 40, which bridges the air dryer 6, is not possible because the pneumatically-controllable directional-control valve 18 is so configured that an air flow from the segment (facing toward the compressor 4) of the pressure-controllable line 40 to the segment (facing toward the air spring 8) of the pressure-controllable line 40 is precluded. This is indicated by the arrow in the upper box of the pneumatically-controllable directional-control line 18 which points from the air spring 8 in the direction of compressor 4. The same applies to the controllable directional-control valve 30.

If the air spring 8 is to be vented, then the control unit 2 drives the control input of the electrically-controllable 3/2 directional-control valve 30 so that this valve transfers from the switching state shown in FIG. 3 into the other switching state. The control line 26 of the first control input 20 of the pneumatically-controllable directional-control valve 18 is then connected to the atmosphere so that the pressure drops in the control line 26. The pressure does not drop in the control line 28 of the second control input 22 of the pneumatically-controllable directional-control valve 18 (here, it is noted that the 3/2 directional-control valve also blocks the control line 28 to the atmosphere in the other switching state). For this reason, the pneumatically-controllable directional-control valve 18 transfers against the return force of the return spring 24 from the switching state shown in FIG. 3 into the other switching state. The air spring 8 is then connected to the atmosphere via the throttle 16, the residual-pressure holding valve 12 and the air dryer 6 and the pneumatically-controllable directional-control valve 18. When venting the air spring 8, the air dryer is here also operated in the regeneration mode. The air spring 8 can only be vented to a residual pressure which is pregiven by the adjustable residual-pressure holding valve 12.

If the air spring 8 is not be vented further, then the control unit 2 switches the electrically-controllable 3/2 directional-control valve 30 so that no current flows therethrough and so that this valve again assumes the switching state shown in FIG. 3. After this switching state has been assumed, the same air pressure is present in the control line 26 of the first control input 20 as in the control line 28 of the second control input 22 so that pressure equilibrium is present at the control inputs 20 and 22. The pneumatically-controllable directional-control valve 18 then goes into the switching state shown in FIG. 3 because of the return force of the return spring 24. The level control arrangement is again in the base state and is available for a renewed filling or venting of the air spring 8.

In the embodiment shown in FIG. 3, the branching location 44, where the pressure-chargeable line 40 ends, is located between the air dryer 6 and the check valve 10. In the static pressure equilibrium (that is, in the base state of the level control arrangement shown in FIG. 3), the pressure of the air spring 8 is present at the control inputs 20 and 22 of the pneumatically-controllable directional-control valve 18. Accordingly, the pneumatically-controllable directional-control valve 18 can be transferred with the aid of the air pressure of the air spring from the first switching state shown in FIG. 3 into the second switching state when the control line 26 is vented to the atmosphere with the aid of the controllable directional-control valve 30 (see above). During the switching operation from the second switching state into the first switching state shown in FIG. 3, a pressure must be first built up at the control input 20 of the pneumatically-controllable directional-control valve 18 which is adequately large in order to transfer the directional-control valve 18 from the second switching state into the first switching state with the aid of the air pressure and the return spring 24. Because of the throttle 16 across which the pressure from the air spring 8 drops, this can last a certain time whereby the switching operation is delayed.

Figure 4:
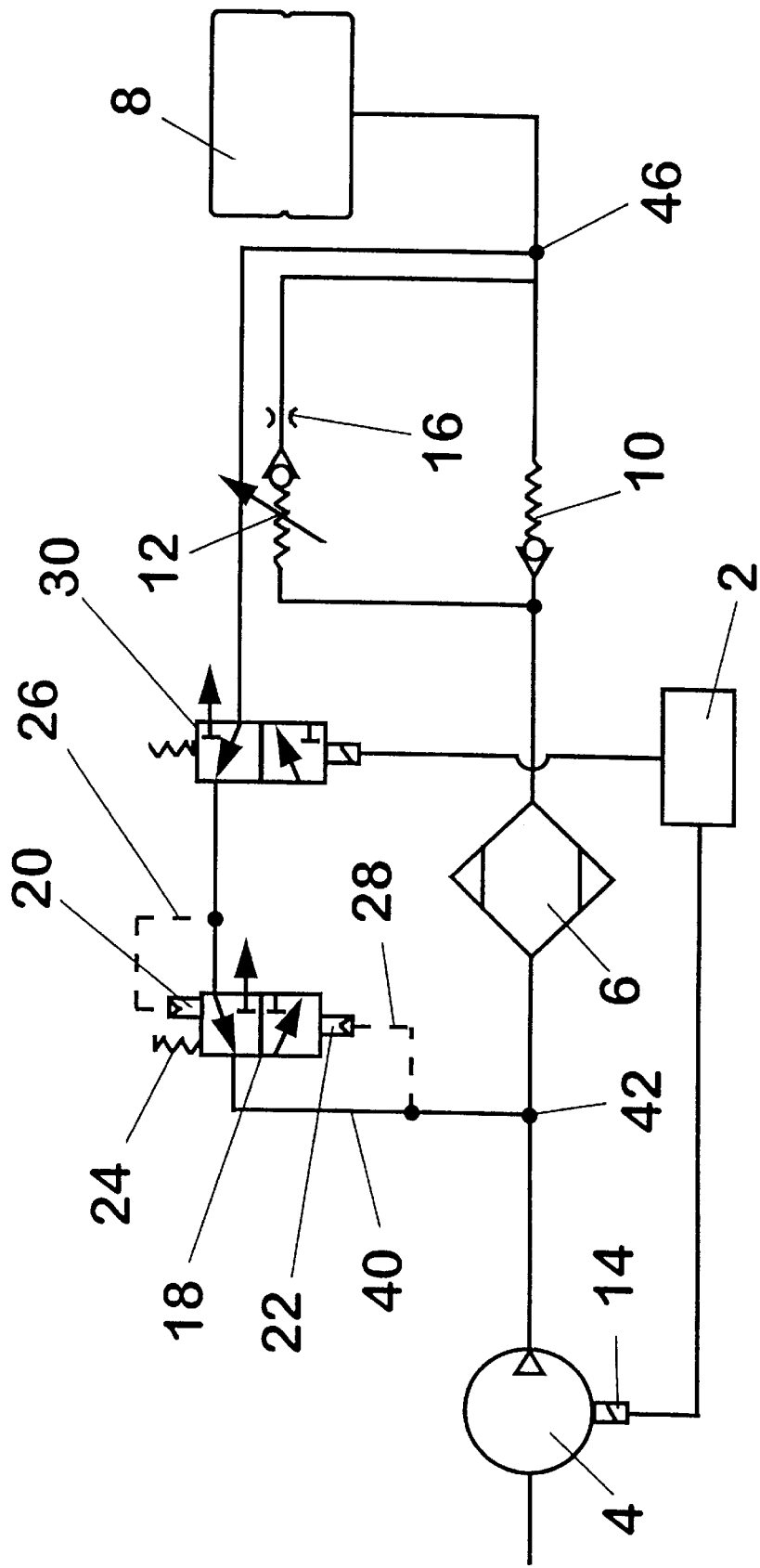

According to a further feature of the embodiment shown in FIG. 3, the end of the pressure-chargeable line 40 is connected into the branch point 46 (see FIG. 4) wherein always the full air pressure of the air spring 8 is present. During the switching operation of the pneumatically-controllable directional-control valve 18 from the second switching state into the first switching state, the air from the air spring 8 is in this case not conducted via the throttle 16 so that correspondingly no pressure losses occur and the full air pressure is therefore immediately present at the control input 20 of the directional-control valve 18. In this way, the switching time at the pneumatically-controllable directional-control valve 18 can be reduced.

It is understood that the foregoing description is that of the preferred embodiments of the invention and that various changes and modifications may be made thereto without departing from the spirit and scope of the invention as defined in the appended claims.

What is claimed is:

1. A level control arrangement for a vehicle with an air spring for suspending the chassis of the vehicle relative to at least one axle, the level control arrangement comprising:

a source for supplying pressurized air;

an air dryer connected to said air spring;

a pneumatically-controllable directional-control valve having first and second control inputs and being switchable between a first switching position wherein said source is connected to said air spring via said air dryer and a second switching position wherein said air dryer is connected to the atmosphere thereby venting said air spring to the atmosphere;

a chargeable line chargeable with the pressurized air from said source;

a first control line connecting said first control input to said chargeable line;

a second control line connecting said second control input to said chargeable line;

a return spring for applying a force to said pneumatically-controllable directional-control valve for fixing said valve in said first switching state when the pressure in said first and second control lines is identical;

means for connecting and disconnecting said first control line to the atmosphere whereby said pneumatically-controllable directional-control valve is switched into said second switching state when said first control line is connected to the atmosphere;

said pneumatically-controllable directional-control valve being connected between said pressure source and said air dryer;

said pneumatically-controllable directional-control valve connecting said source to said air dryer in said first switching position thereof and connecting the atmosphere to said air dryer in said second switching position thereof; and, said pneumatically-controllable directional-control valve being arranged in said chargeable line.

2. The level control arrangement of claim 1, further comprising a controllable 3/2 directional-control valve switchable between a first switching position wherein said first control input is connected to the atmosphere and a second switching position wherein said first control input is connected to said chargeable line.

3. The level control arrangement of claim 1, said first control line being subdivided into first and second segments and said first segment being connected to said first control input; and, said arrangement further comprising: a 2/2 directional-control valve switchable between a first switching position and a second switching position wherein said first segment is connected to the atmosphere; a throttle; and, said second segment being connected to said chargeable line via said throttle.

4. The level control arrangement of claim 1, further comprising a residual pressure holding valve arranged between said air spring and said air dryer; and, said air spring being connected to said air dryer via said residual pressure holding valve for venting said air spring.

5. The level control arrangement of claim 1, said first and second control lines having respective free ends connected to said chargeable line; and, said chargeable line connecting said air dryer to said pneumatically-controllable directional-control valve.

* * * * *